(12) United States Patent
Buchman

(10) Patent No.: US 6,531,081 B1
(45) Date of Patent: Mar. 11, 2003

(54) PROFILED EXTRUDED SLIDER DEVICES AND METHODS

(75) Inventor: James E. Buchman, Hortonville, WI (US)

(73) Assignee: Reynolds Consumer Products, Inc., Richmond, VA (US)

( * ) Notice: Subject to any disclaimer, the term of this patent is extended or adjusted under 35 U.S.C. 154(b) by 335 days.

(21) Appl. No.: 09/599,314

(22) Filed: Jun. 22, 2000

(51) Int. Cl.[7] .............................................. B29C 47/00
(52) U.S. Cl. ...................... 264/148; 264/151; 264/157; 264/210.2; 264/280
(58) Field of Search ................................ 264/148, 150, 264/151, 157, 167, 210.2, 280; 428/156

(56) References Cited

U.S. PATENT DOCUMENTS

| | | |
|---|---|---|
| 1,887,741 A | 11/1932 | Trotter |
| 2,355,152 A | 8/1944 | Goldstein |
| 3,173,184 A | 3/1965 | Ausnit |
| 3,220,076 A | 11/1965 | Ausnit et al. |
| 3,235,439 A | 2/1966 | Schultheiss |
| 3,426,396 A | 2/1969 | Laguerre |
| 3,790,992 A * | 2/1974 | Herz ............................ 156/251 |
| 3,959,856 A | 6/1976 | Ausnit |
| 4,062,919 A | 12/1977 | Rojahn et al. |
| 4,576,773 A | 3/1986 | Azzola et al. |
| 4,765,936 A | 8/1988 | Ballocca |
| 5,010,627 A * | 4/1991 | Herrington et al. ............ 24/399 |
| 5,131,121 A | 7/1992 | Herrington, Jr. et al. |
| 5,301,394 A * | 4/1994 | Richardson et al. ........... 24/399 |
| 5,405,478 A * | 4/1995 | Richardson et al. ...... 156/308.4 |
| 5,431,760 A | 7/1995 | Donovan |
| 5,442,838 A | 8/1995 | Richardson et al. |
| 5,833,791 A | 11/1998 | Bryniarski et al. |
| 5,871,281 A * | 2/1999 | Stolmeier et al. .............. 24/417 |
| 5,956,815 A * | 9/1999 | O'Connor et al. ........ 24/30.5 R |
| 6,247,844 B1 * | 6/2001 | Tomic et al. ................... 24/400 |
| 6,306,071 B1 * | 10/2001 | Tomic ......................... 493/114 |

* cited by examiner

*Primary Examiner*—Mark Eashoo
(74) *Attorney, Agent, or Firm*—Julie R. Daulton; Tracey D. Beiriger

(57) ABSTRACT

A slider device and methods of making. The slider device is for use with a resealable package having a zipper closure, and includes a top wall with first and second ends, a spreader depending from the top wall, a first sidewall with a first hook construction extending therefrom, and a second side wall with a second hook construction extending therefrom. An extended length of profiled material is extruded and can be converted to form individual slider devices. The spreader can be tapered, either in its width or the distance in which is depends from the top wall. These slider devices can be incorporated into resealable packages.

13 Claims, 12 Drawing Sheets

PROFILED EXTRUDED SLIDER DEVICES AND METHODS

FIELD OF THE DISCLOSURE

The present disclosure generally relates to slider devices used in conjunction with closure arrangements for packages, such as, plastic bags. In particular, the present disclosure relates to methods of manufacturing slider devices, the slider devices themselves, and the packages incorporating the slider devices.

BACKGROUND

Many packaging applications use resealable containers to store or enclose various types of articles and materials. These packages may be used to store food products, non-food consumer goods, medical supplies, waste materials, and many other articles. Resealable packages having zipper closure mechanisms are convenient in that they can be closed and resealed after the initial opening to preserve the enclosed contents. Goods that are not used completely when the package is initially opened rely on the zipper closure to reclose the package and keep the remaining contents fresh. The need to locate a storage container for the unused portion of the products in the package is thus avoided. In some instances, providing products in resealable packages appreciably enhances the marketability of those products. Examples of consumable goods that are often packaged in packages, such as bags, with a zipper closure include potting soil, fertilizer, pet food, dog biscuits, vegetables, cereal, and many different foods edible by humans.

For some types of resealable packages, the opening and closing of the zipper closure is facilitated by a slider device that is mounted on the zipper closure. The slider device typically includes a separator or spreader-type structure at one end that opens or unmates the zipper closure mechanism when the slider device travels in a first direction along the zipper. The sidewalls of the slider device are configured so that the sidewalls engage the zipper mating profiles and progressively move them into engagement to close the resealable package when the slider device is moved along the zipper in a direction opposite the first direction.

Improvements in the design and manufacture of slider devices are desirable.

SUMMARY OF THE DISCLOSURE

In one aspect of the present disclosure, methods of making slider devices for opening and closing resealable zipper closures are disclosed. Generally, the methods comprise extruding an extended length of profiled material that is then converted into individual slider devices by a variety of methods.

One preferred slider device includes a top wall; a spreader depending from the top wall; first and second sidewalls; and first and second hook constructions. In one embodiment, the distance the spreader depends from the top wall changes along the length of the slider device from a first end to a second opposite end. This taper can be created, for example, by manipulating the configuration of the extrusion die through which the slider device is extruded. In another embodiment, the width of the spreader tapers from the first end of the slider device to the second opposite end. This taper can be created, for example, by manipulating the configuration of the extrusion die. Alternately, the taper can be created by deforming the slider device after it has exited the extrusion die.

Flexible packages are provided that comprise a package surrounding wall having first and second side edges and a mouth therebetween. The side edges can be side seals. A reclosable zipper closure is provided along the mouth for selective opening and closing of the mouth. A slider device of the type manufactured above is operably mounted on the zipper closure to open and close the package. One preferred zipper closure includes first and second mating profiles defining first and second shoulders, respectively. First and second hook constructions are included on the slider device for engaging the first and second shoulders as the slider device is slid along the zipper closure.

In a particular embodiment, the disclosure is directed to a method for making a plurality of slider devices, each slider device having a first end and an opposite second end, a first side edge and an opposite second side edge, a top wall, a first arm depending from the top wall at the first side edge with a first hook on the first arm opposite the top wall, and a second arm depending from the top wall at the second side edge, with a second hood on the second arm opposite the top wall, and a spreader depending from the top wall between the first arm and the second arm. Each slider device is constructed and arranged to interlock first and second mating profiles of a zipper closure when the slider device is moved in a first direction along the zipper closure, and to disengage the first and second mating profiles when the slider device is moved in an opposite second direction along the zipper closure. The method comprises forming an extended length of profiled material, and converting the extended length of profiled material into a plurality of slider devices. The profile material that is formed, typically by extrusion, comprises: an extended length of top wall, an extended length of spreader material depending from the extended length of top wall, an extended length of first arm material depending from the extended length of top wall, and an extended length of second arm material depending from the extended length of top wall.

The present disclosure is also directed to an extended length of profiled material that can be processed into individual slider devices.

DETAILED DESCRIPTION

Figure 1:
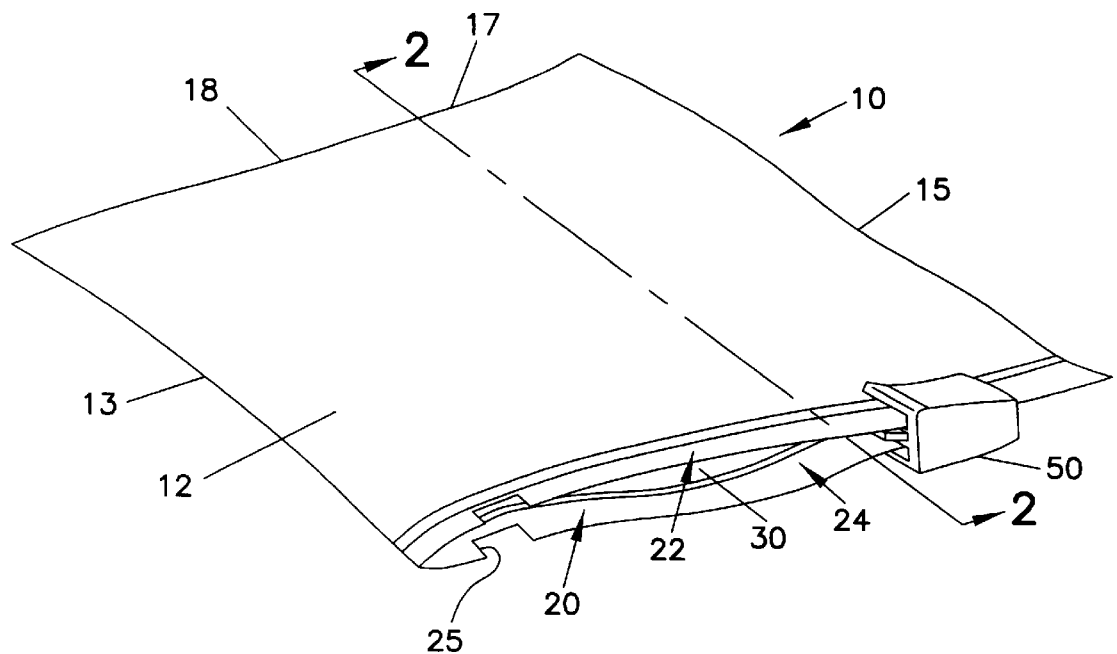
FIG. 1 is a perspective view of a flexible, resealable package having a slider device, according to principles of this disclosure.
Figure 2:
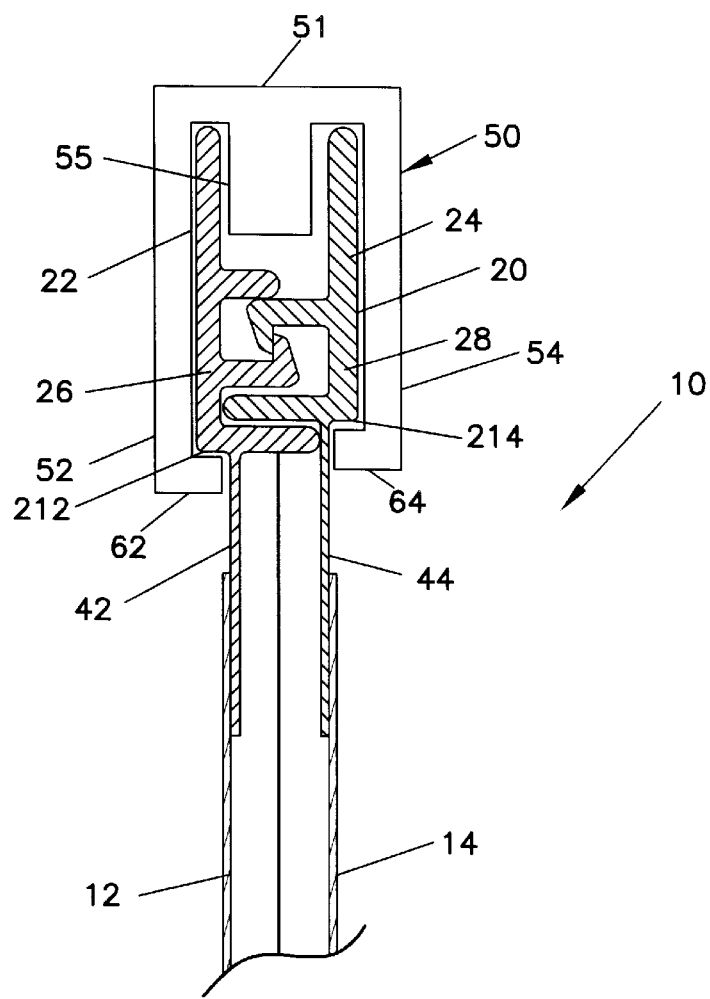
FIG. 2 is a fragmented, cross-sectional view of the flexible, resealable package taken along line 2—2 of FIG. 1.
Figure 2:
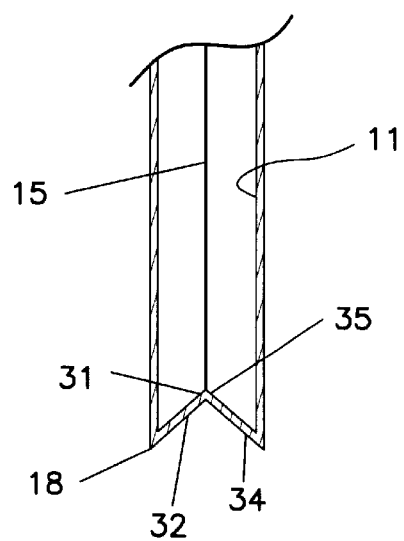

Attention is directed to FIGS. 1 and 2, which illustrate an example packaging arrangement in the form of a resealable, flexible package 10, for example, a polymeric package such as a plastic bag, having a resealable zipper closure 20. The flexible package 10 includes first and second opposed panel sections 12, 14, typically made from a flexible, polymeric, plastic film. The first and second panel sections 12, 14 provide a surrounding wall for the package. With some manufacturing applications, the first and second panel sections 12, 14 are heat-sealed together along two side edges 13, 15 and meet at a fold line 17 (FIG. 1) to form a three-edged containment section; a product can be retained within an interior 11 (FIG. 2) of the package 10. In the embodiment shown, the fold line 17 is the bottom edge 18 of the package 10. Alternatively, two separate panel sections 12, 14 of plastic film may be used and heat-sealed together along the two side edges 13, 15 and at the bottom edge 18. In yet another embodiment, panel sections 12, 14 can be formed from a tube-like sheet of material configured to form folds at each of side edges 13, 15; side panels 12, 14 are heat-sealed together along bottom edge 18. Access is provided to the interior 11 of the package 10 through a mouth 30 (FIG. 1) of the package 10. In the particular embodiment shown, the mouth 30 extends the width of the package 10; that is, mouth 30 extends from first side edge 13 to second side edge 15.

Bottom edge 18 can include a gusset 31, seen in FIG. 2. Gussets are known for providing packages with "stand-up" features. Gusset 31 of package 10 has first and second gusset sections 32, 34, which are essentially equal in length. Preferably, each of the first and second gusset sections 32, 34 is made from the same piece of material as the first and second panel sections 12, 14, respectively. Typically when making gusset 31, a single piece of film is folded to form the opposing panel sections 12, 14. Along the fold line between the first and second panel sections 12, 14, fold 35 is then formed, which results in the first and second gusset sections 32, 34 with the fold line 35 therebetween. Eventually, heat is applied to form the side edges 13, 15 (FIG. 1), which will form a seal between all four layers of the package along each respective gusseted side edge of the package.

A zipper closure arrangement 20 having mating profiles to open and close (unseal and reseal) the mouth 30 of package 10 extends along the mouth 30, preferably across the width of package 10. That is, zipper closure 20 preferably extends from first side edge 13 to second side edge 15. The zipper closure 20 can include a variety of configurations and structures. Zipper closure 20 can be configured in any known manner, for example, such as disclosed in U.S. Pat. Nos. 4,240,241; 4,246,288; and 4,437,293; each of which is incorporated by reference herein. By the term "zipper closure" or "zipper closure mechanism," it is meant a structure having opposite interlocking or mating profiled elements that, under the application of pressure, will interlock and close the region between the profiles.

Figure 3:
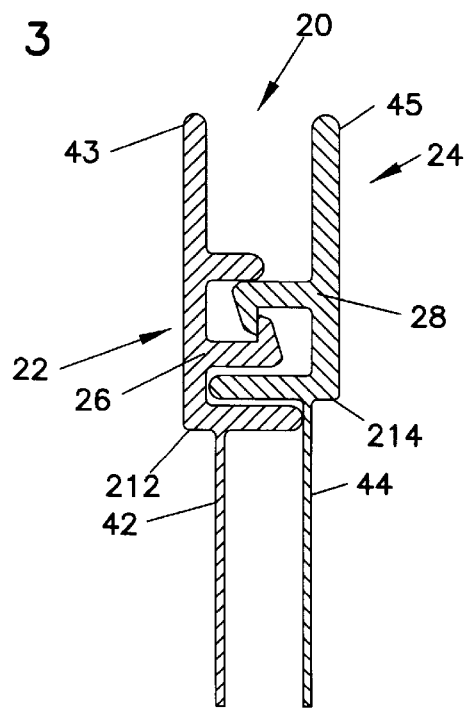
FIG. 3 is an enlarged, schematic cross sectional view of a zipper closure such as of the flexible, resealable package of FIGS. 1 and 2, without a slider device mounted thereon.

Referring to FIGS. 2 and 3, zipper closure 20 has a first mating profile 22 and a second mating profile 24 which engage and disengage, as appropriate, to open and close package 10. In particular, first mating member 26 of first mating profile 22, and second mating member 28 of second mating profile 24 interlock as appropriate, to engage and disengage mating profiles 22, 24. First and second mating profiles 22, 24 of zipper closure 20 are attached to side panels 12, 14, respectively, by sealing flanges 42, 44 as will be described in detail below. The transition area between mating members 26, 28 and sealing flanges 42, 44 is identified by shoulders 212, 214. Opposite sealing flanges 42, 44 are the distal ends 43, 45 (FIG. 3) of mating profiles 22, 24.

In the embodiment shown in FIG. 1, the resealable zipper closure 20 extends the width of mouth 30 from first side edge 13 to second side edge 15. Alternatively, the mouth 30 and zipper closure 20 could be positioned on a package at a location different from the mouth 30 of the package 10, depending on the application needs for the package. For example, mouth 30 and zipper closure 20 can be positioned within one of side panels 12, 14.

In some applications, the mating profiles 22, 24 are formed by two separate extrusions or through two separate openings of a common extrusion die. In other applications, the mating profiles 22, 24 are formed as a single extrusion, which may then be slit and split apart to form two individual profiles. Typically, the mating profiles 22, 24 of resealable zipper closure 20 are made of conventional polymeric materials, such as polyethylene or polypropylene.

Referring again to FIGS. 1 and 2, slider device 50 is mounted on zipper closure 20 to facilitate opening and closing of zipper closure 20. Slider devices and how they function to open and close zipper closures, in general, are taught, for example, in U.S. Pat. Nos. 5,063,644; 5,301,394; and 5,442,837, each of which is incorporated by reference herein. Additional information regarding methods of making slider device 50 are described below.

A notch 25 is disposed within zipper closure 20 in FIG. 1 adjacent to first side edge 13 of package 10. Notch 25 is designed to provide a "park place" into which slider device 50 settles when zipper closure 20 is sealed and slider device 50 is at first side edge 13. Such a notch 25 may decrease any tendency for an incomplete interlock between first mating profile 22 and second mating profile 24. A preferred notch 25 includes two straight edges or sides generally perpendicular to each other, and an opposed side that extends at, in a preferred embodiment, an oblique angle relative to its adjacent side. By "oblique angle", it is meant an angle that is not substantially perpendicular or straight. A preferred notch 25 is generally trapezoidal in shape.

Slider devices, such as slider device 50 mounted on zipper closure 20 in package 10, are generally well known. Referring to slider device 50 in FIG. 2, slider device 50 has a top wall 51 from which depend first arm 52 and second arm 54; first and second arms 52, 54 form exterior or external sidewalls of slider device 50. First arm 52, in particular first hook 62, engages over shoulder 212 and second arm 54, in particular second hook 64, engages over shoulder 214. Extending from top wall 51, and positioned between distal ends 43, 45 (FIG. 3) of mating profiles 22, 24, is spreader 55, which pries apart mating profiles 22, 24 when slider device 50 is moved in a first direction along zipper closure 20; when moved in a second opposite directional along zipper closure 20, slider device 50 interlocks mating profiles 22, 24. The present disclosure is directed at improved methods of making slider devices for opening and closing (unmating and mating) interlockable mating profiles.

Figure 4:
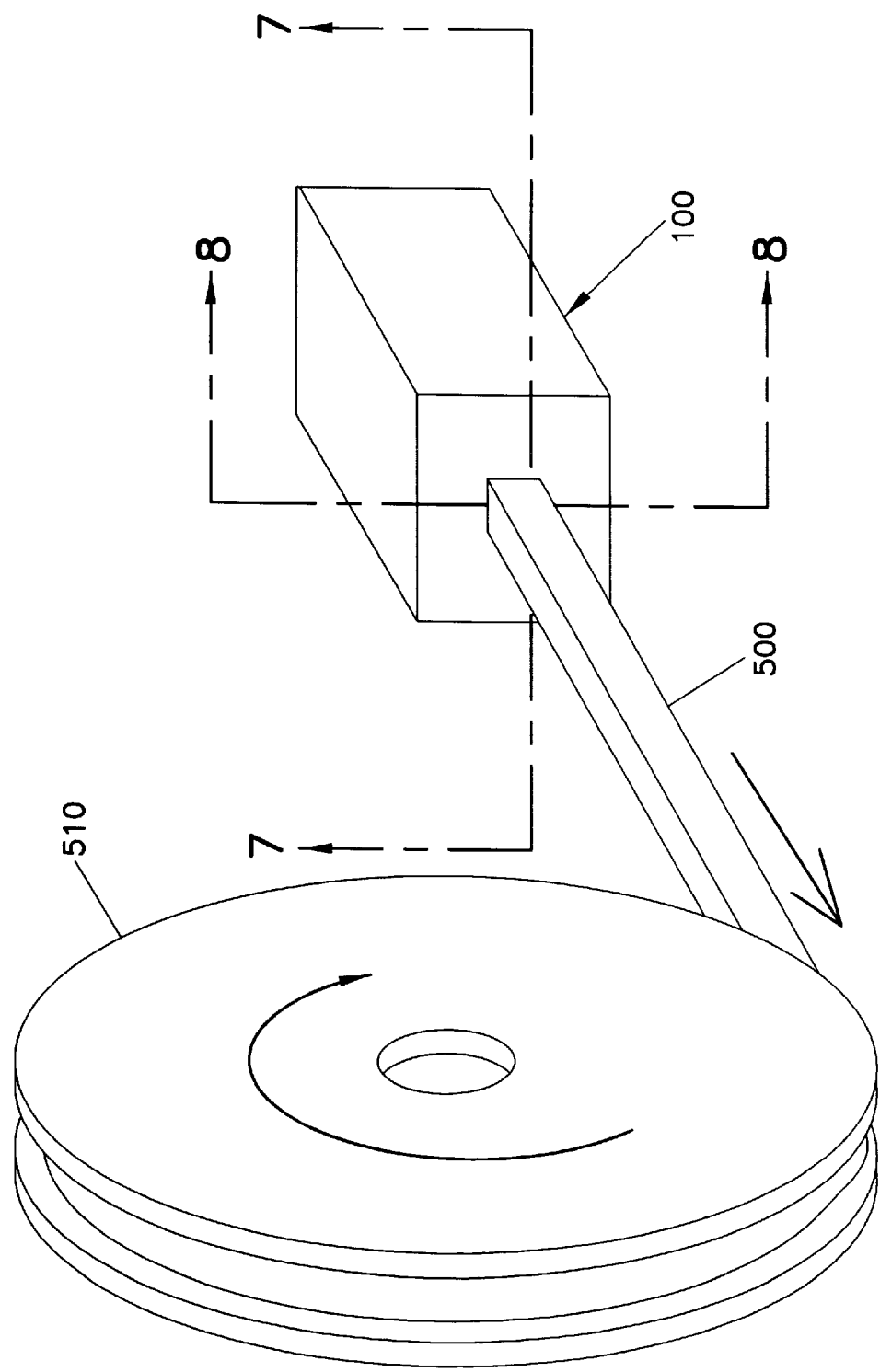
FIG. 4 is a schematic view of a process for extruding an extended length of profiled material that will result in individual slider devices.

The general concept of the methods of the present disclosure is shown in FIG. 4. An extended length of profiled material 500 is extruded through die 100. This profiled material 500 will eventually provide a slider device that can be used to open and close interlocking mating profiles of a zipper closure.

Extrusion processes are well known; they generally involve shaping a polymeric material, typically a thermoplastic material, by passing it through a shaped die under pressure. In some embodiments, extrusion of thermosetting materials is feasible. Thermoplastic polymeric material is typically provided as solid pellets, which are melted, or at least softened, within an extruder. In some embodiments, other or additional methods for melting or softening of the material are done prior to the material entering the extruder. The extruder provides the pressure to force the material through the die. The extruder used can be a single screw, twin screw, ram, or any other type of extruder. Upon exiting the die, the polymeric material, now referred to as an "extrudate", has a shape that corresponds to the die through which it passed. The extrudate is typically cooled, for example, by air or water, prior to further processing.

Figure 5:
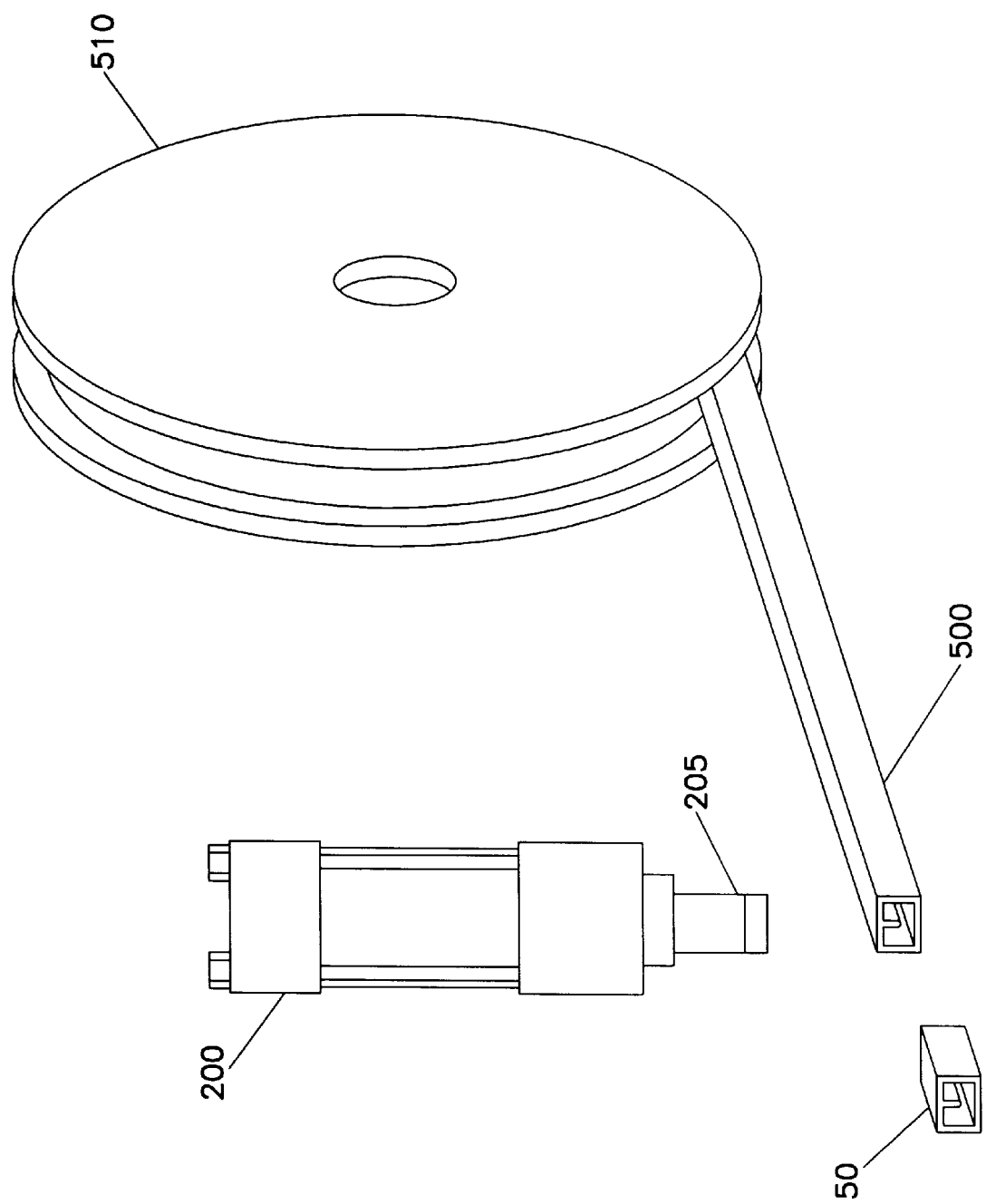
FIG. 5 is a schematic view of a process for cutting individual slider devices from an extended length of profiled material.
Figure 6:
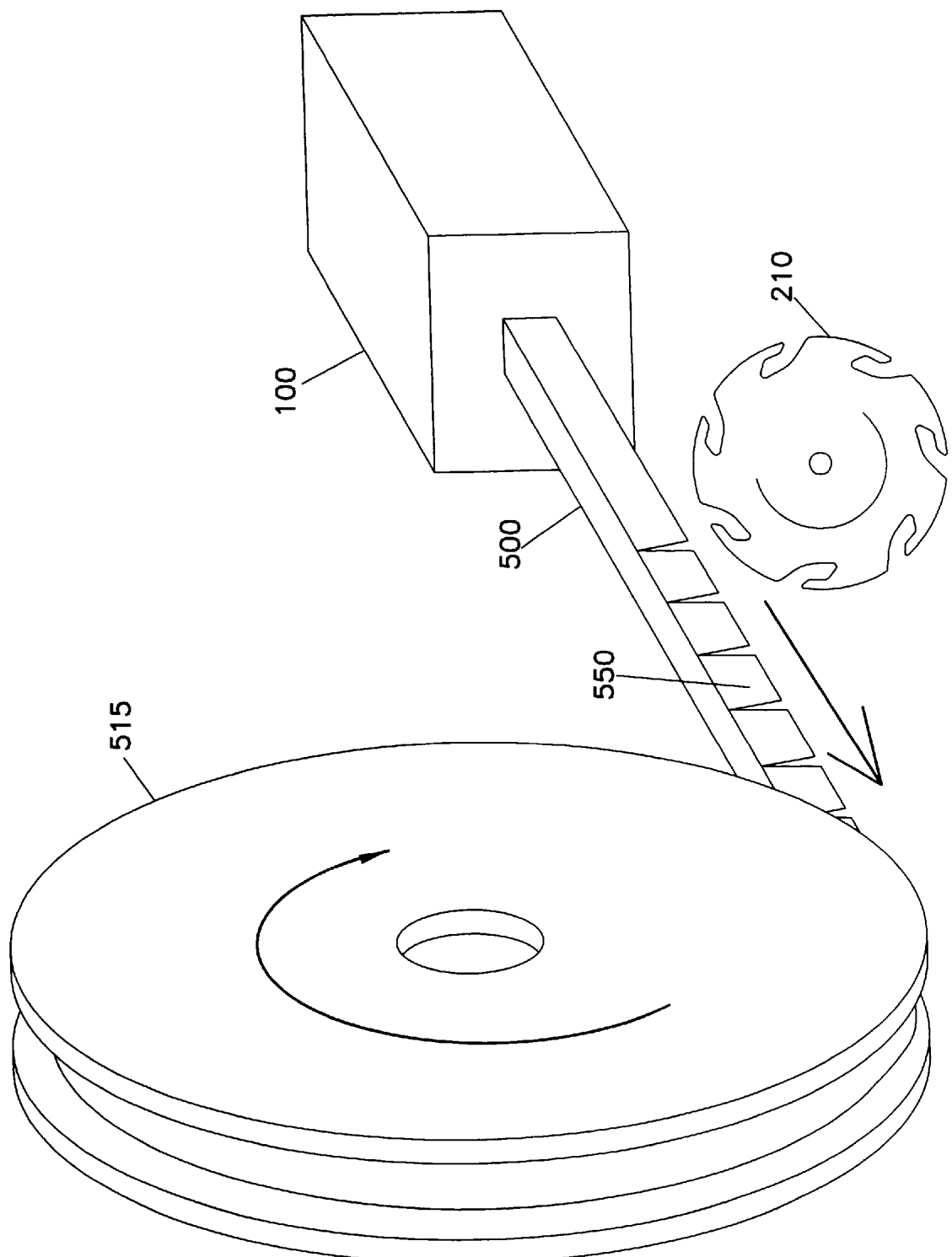
FIG. 6 is a schematic view of a combined process for extruding an extended length of profiled material and cutting individual slider devices from that material.

Referring again to FIG. 4, the extended length of profiled material 500 obtained from die 100 is wound on a core or the like to provide spool 510. The extended length of profiled material 500 can be later unwound, as shown in FIG. 5, and individual slider devices 50 can be extracted from the extended length of profiled material 500. In FIG. 5, a cutting device 200, which can include a pneumatic or hydraulic piston, has a blade 205 that cuts, slices, or otherwise separates individual slider devices 50 from the extended length of profiled material 500. In another embodiment, shown in FIG. 6, the extended length of profiled material 500, after leaving die 100, can be cut, sliced, or scored with a rotary cutting blade 210, providing an extended length of segmented material 550. This segmented material 550 is wound on a core or the like to provide spool 515, and can be later process to provide individual slider devices.

Figure 7:
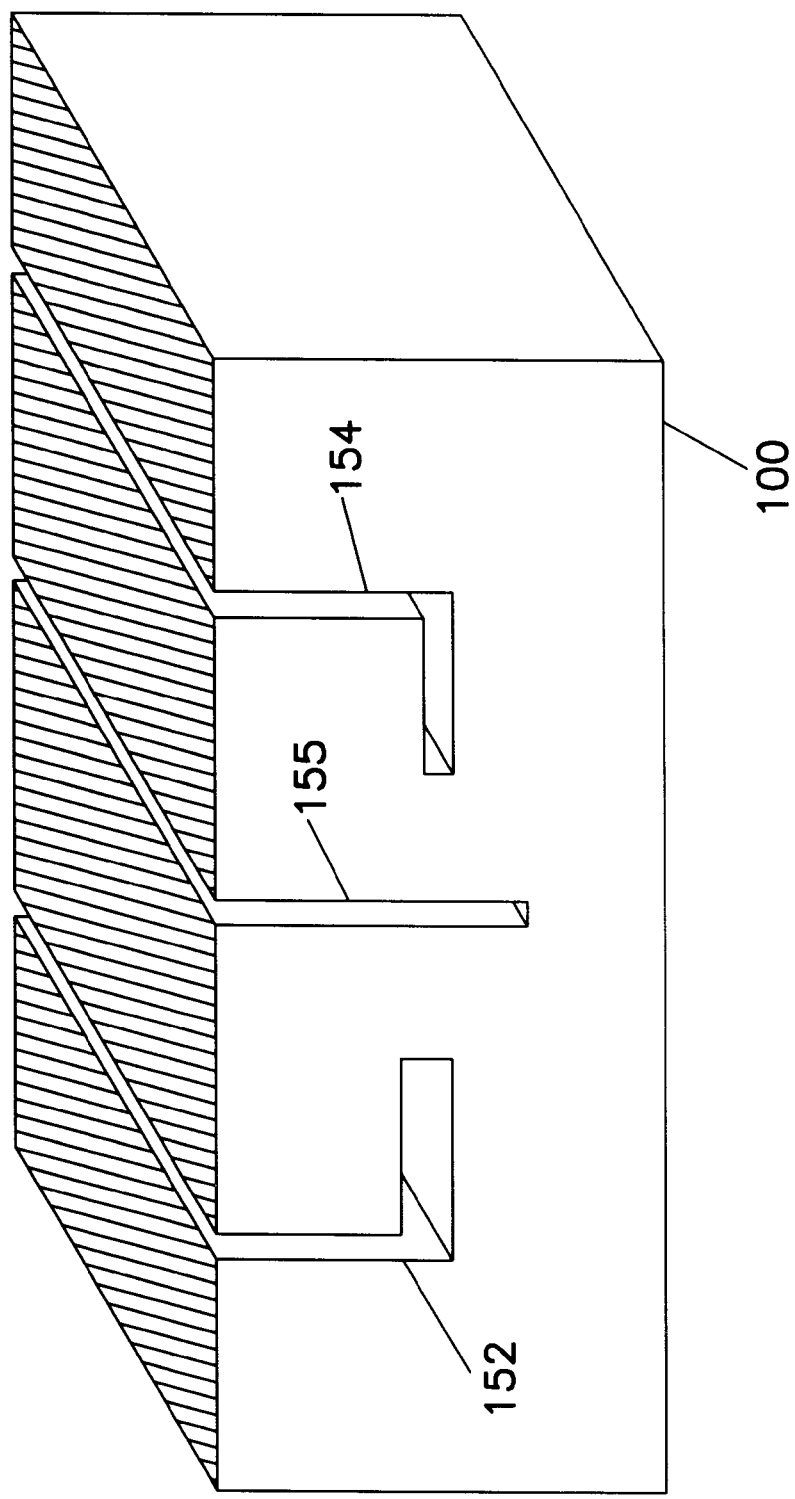
FIG. 7 is a cross-sectional view of the extrusion die taken along line 7—7 of FIG. 4.

FIG. 7 shows a cross-sectional view of die 100 that can be used to provide extended length of profiled material 500. Die 100 includes a first passageway 152, a second passageway 154, and a central passageway 155. These passageways, respectively, provide first arm 52, second arm 54, and spreader 55 of slider device 50 of FIG. 2.

Figure 8:
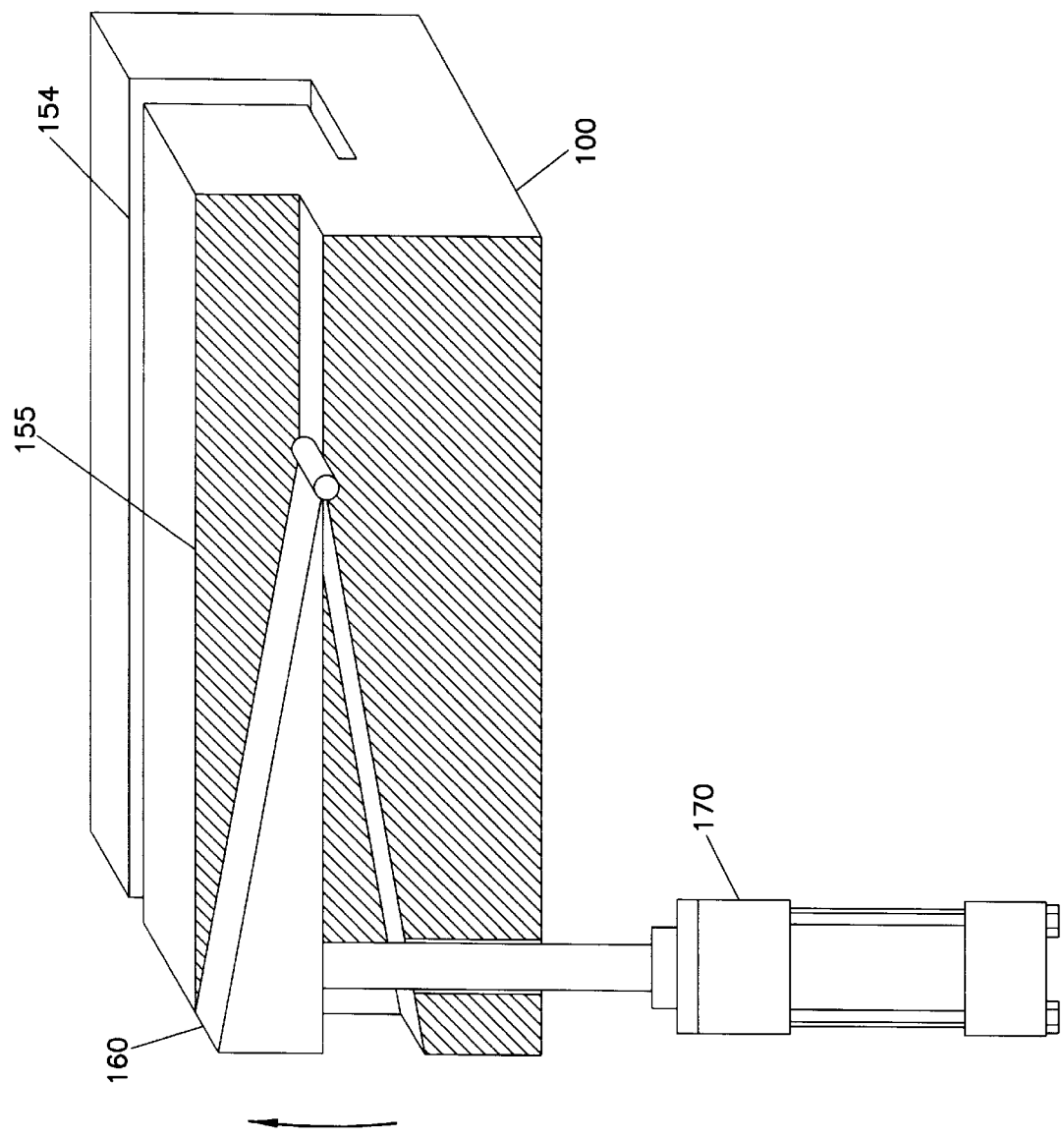
FIG. 8 is a cross-sectional view of the extrusion die taken along line 8—8 of FIG. 4, with the die in a first position.
Figure 9:
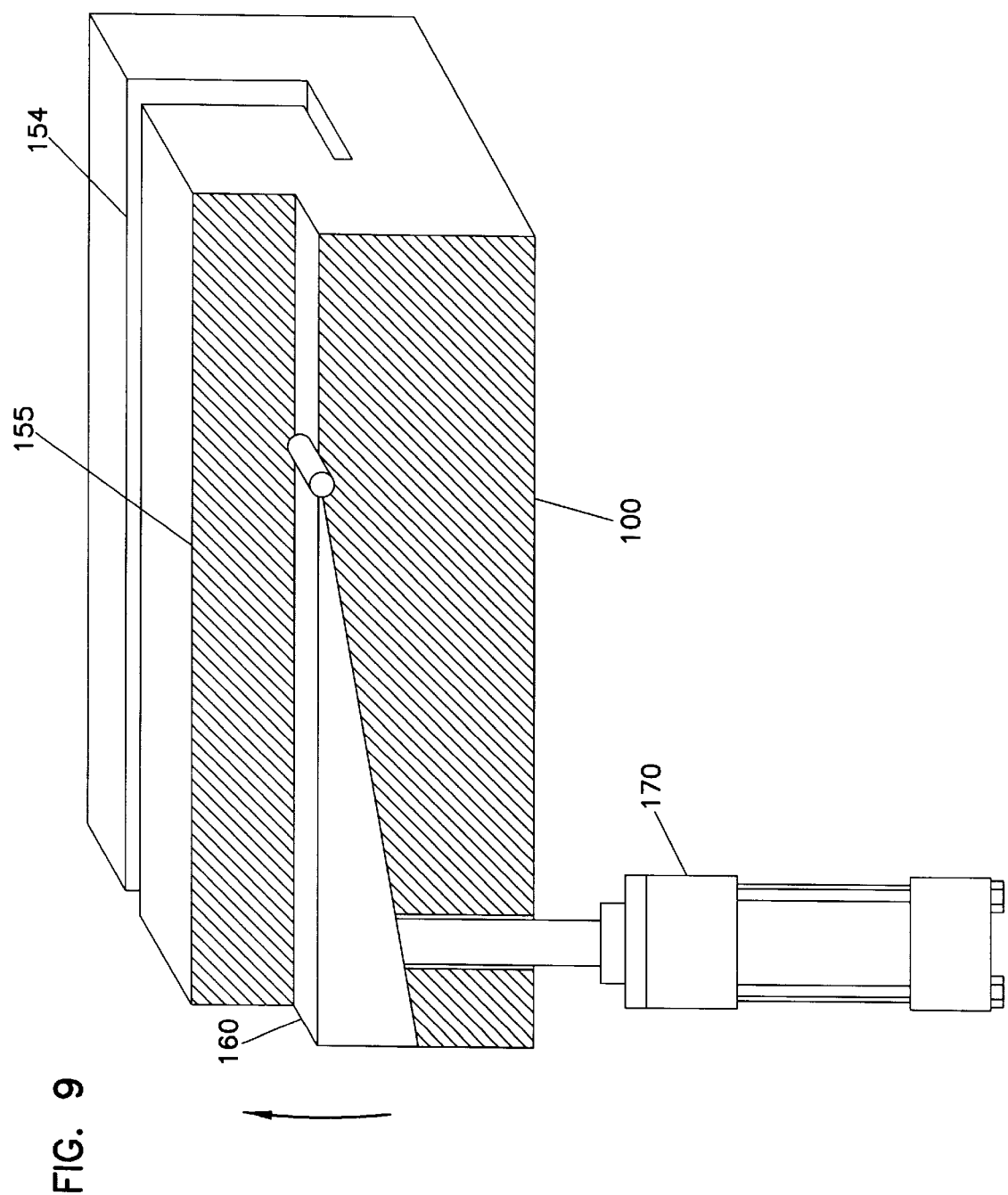
FIG. 9 is a cross-sectional view of the extrusion die taken along line 8—8 of FIG. 4, with the die in a second position.

In FIGS. 8 and 9, a cross-sectional view of die 100, orthogonal to the view of FIG. 7, is shown; the cross-section is taken through the center of central passageway 155 of FIG. 7. In one embodiment of the present disclosure, die 100 includes an adjustable feature, such as arm or wedge 160, which changes the internal configuration of die 100, in particular, of the central passageway 155. Thus, the shape of the extrudate exiting die 100, in particular, the portion of extended length of profiled material 500 that forms spreader 55 (FIG. 2), is changed. By varying the depth of central passageway 155, the distance that spreader 55 (FIG. 2) depends from top wall 51 (FIG. 2) can be adjusted. Similarly, by varying the width of central passageway 155, the width of spreader 55 (FIG. 2) can be adjusted; the width of spreader 55 is the distance between spreader 55 and first arm or sidewall 52 (FIG. 2) and second arm or sidewall 54 (FIG. 2).

Generally, any portion of spreader 55, which extends between distal ends 43, 45 (FIG. 3), generally facilitates disengaging, unmating, unlocking, or otherwise opening mating profiles 22, 24; conversely, any portion of spreader 55 that does not extend between distal ends 43, 45 (FIG. 3) generally facilitates engaging, mating, interlocking, or otherwise closing mating profiles 22, 24.

The adjustable feature of die 100 is moveable, adjustable, pivotable, or otherwise can be moved from a first position to a second position. The adjustable feature can be made from the same material as die 100, can be attached in some manner to die 100, or can be integral with die 100 (that is, the adjustable feature can be a continuous element of die 100). Typically, each of die 100 and the adjustable feature is metal.

In FIG. 8, adjustable arm 160 is in a first, extended position, decreasing the area of central passageway 155 through which polymeric material can pass. In FIG. 9, adjustable arm 160 is in a retracted position, enlarging central passageway 155; in the embodiment shown in FIG. 9, passageway 155 is essentially linear along its length. As adjustable arm 160 is alternated between the two positions, the shape of the extrudate, particularly the extended length of material that will result in spreader 55, varies. In FIGS. 8 and 9, polymeric material would pass through from right to left, as shown.

Figure 10:
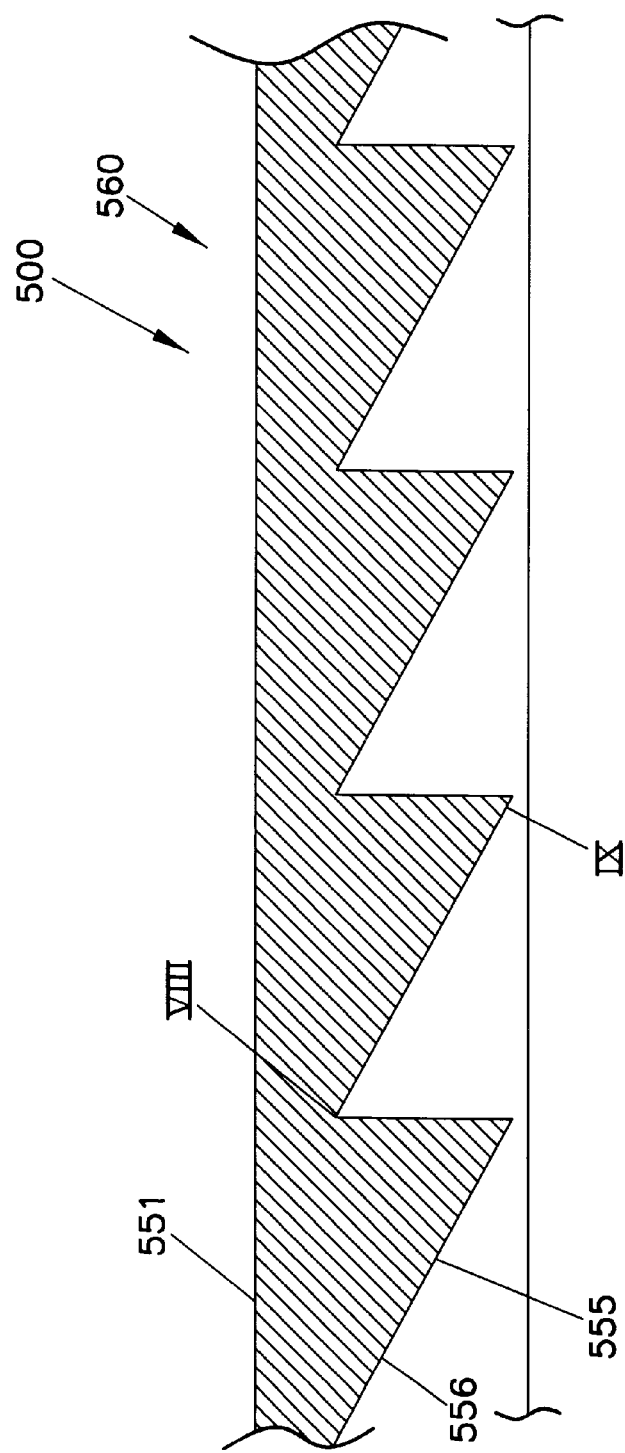
FIG. 10 is a cross-sectional side view of an extended length of profiled material produced with the extrusion die of FIGS. 8 and 9.

Referring to FIG. 10, an extended length of profile material 500, which has been extruded through a die with an adjustable feature, such as die 100 with adjustable arm 160 of FIGS. 8 and 9, is shown as extended length of manipulated profile 560. Material that passed through central passageway 155 of die 100 in FIGS. 8 and 9 formed extended length of spreader 555 depending from extended length of top wall 551; as adjustable arm 160 was moved from the extended to the retracted position, an extended length of manipulated spreader 556 was formed. As seen in FIG. 10, extended length of manipulated spreader 556 has a shaped, or patterned structure. Point VIII of extended length of manipulated spreader 556 was formed with adjustable arm 160 extended as in FIG. 8, and point IX of extended length of manipulated spreader 556 was formed with adjustable arm 160 retracted as in FIG. 9. The overall shape of extended length of manipulated spreader 556 is a saw-tooth pattern. In some embodiments, the extrusion may be not as precise, and instead may form a sinusoidal or similar pattern.

In another embodiment, not shown in the figures, an adjustable feature, which may include two oppositely positioned adjustable arms, is used to provide a taper to central passageway 155 (FIG. 7). The adjustable arms can be moved from a first, extended position to a second, retracted position. When in the extended position, the width of passageway 155 would be less than when the arms were in the retracted position. Preferably, two adjustable arms are provided to provide a symmetrical deformation or taper to spreader 55, although in some embodiments only one adjustable feature may be used.

Adjustable arm 160 of FIGS. 8 and 9, and any other adjustable arms or features, are moved, for example pivoted, by piston 170. To extend adjustable arm 160 to the position shown in FIG. 8, piston 170 is extended; to retract adjustable arm 160 to the position shown in FIG. 9, piston 170 is retracted. It is understood that positions between the extended position of FIG. 8 and the retracted position of FIG. 9 can also be obtained.

The extended length of profiled material 500 of FIG. 10, having the extended length of manipulated spreader 556, can be wound on a core or spool for later processing, can be immediately separated into individual sliders, or can be further processed as described below.

Figure 11:
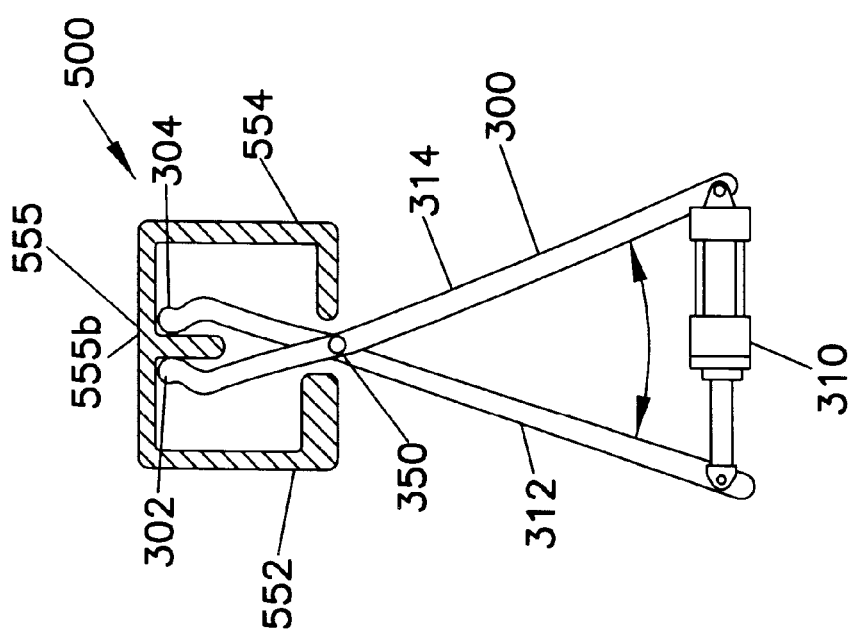
FIG. 11 is a schematic view of a process for forming a slider device utilizing a crimper mechanism, the crimper mechanism in a first position.
Figure 12:
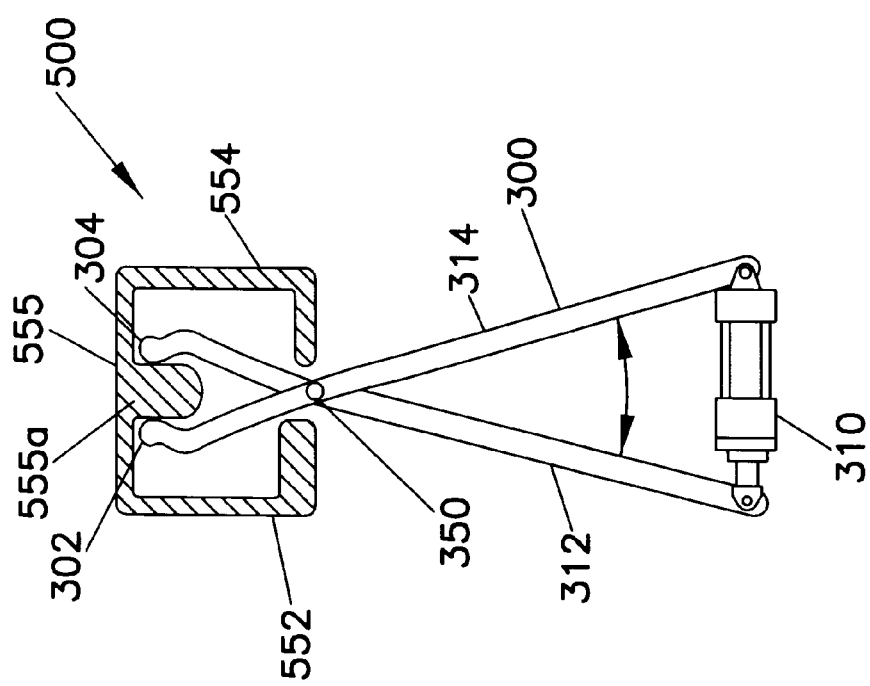
FIG. 12 is a schematic view of a process for forming a slider device utilizing a crimper mechanism, the crimper mechanism in a second position.

In another embodiment of the present disclosure, various parts of the extended length of profiled material 500 (FIGS. 4 through 6) can be modified after the spreader 55, or extended length of spreader 555, is already formed. FIGS. 11 and 12 show a process for modifying the width of spreader 55 of slider device 50 shown in FIG. 2; that is, the process modifys the distance from spreader 55 to first arm 52 and from spreader to second arm 54. Specifically, FIGS. 11 and 12 show a process for modifying the width of extended length of spreader 555. In each of FIGS. 11 and 12, an extended length of profiled material 500 has lengths of first and second arms or sidewalls 552, 554 with extended length of spreader 555 therebetween.

A crimping mechanism 300 is used to decrease the width of portions of extended length of spreader 555. Crimping mechanism 300 has first and second arms 312, 314, connected at pivot point 350. Arms 312, 314 have crimping ends 302, 304 and an expanding mechanism, such as piston 310, opposite ends 302, 304. Ends 302, 304 are constructed to seat and press against portions of extended length of spreader 555. In FIG. 11, crimping mechanism 300 is in a relaxed position, with piston 310 relaxed and no deforming forces acting on various parts of the extended length of profiled material 500, in particular on extended length of spreader 555. The undisturbed extended length of spreader 555 is shown as thick section of extended length of spreader 555a. In FIG. 12, piston 310 has extended or expanded, thereby decreasing by distance between crimping ends 302, 304 via pivot point 350. Crimping ends 302, 304 are brought together, thereby crushing, squeezing, or otherwise deforming extended length of spreader 555 in the area where ends 302, 304 contact extended length of spreader 555; this creates a thinned section of extended length of spreader 555b. During the crimping processes, extended length of profiled material 500 may be incrementally indexed or may be continuously moving; in embodiments where extended length of profiled material 500 is continuously moving, it may be desired to also have crimping mechanism 300 move with extended length of profiled material 500.

In most embodiments, it is desired that the extended length of profiled material 500 is not completely cooled after exiting the extrusion die when the crimping operation is applied. It is easier to crimp or otherwise deform the extended length of spreader 555 while the material is at least partially molten or soft, so that the material is somewhat deformable, pliable, conformable, and the like.

Figure 13:
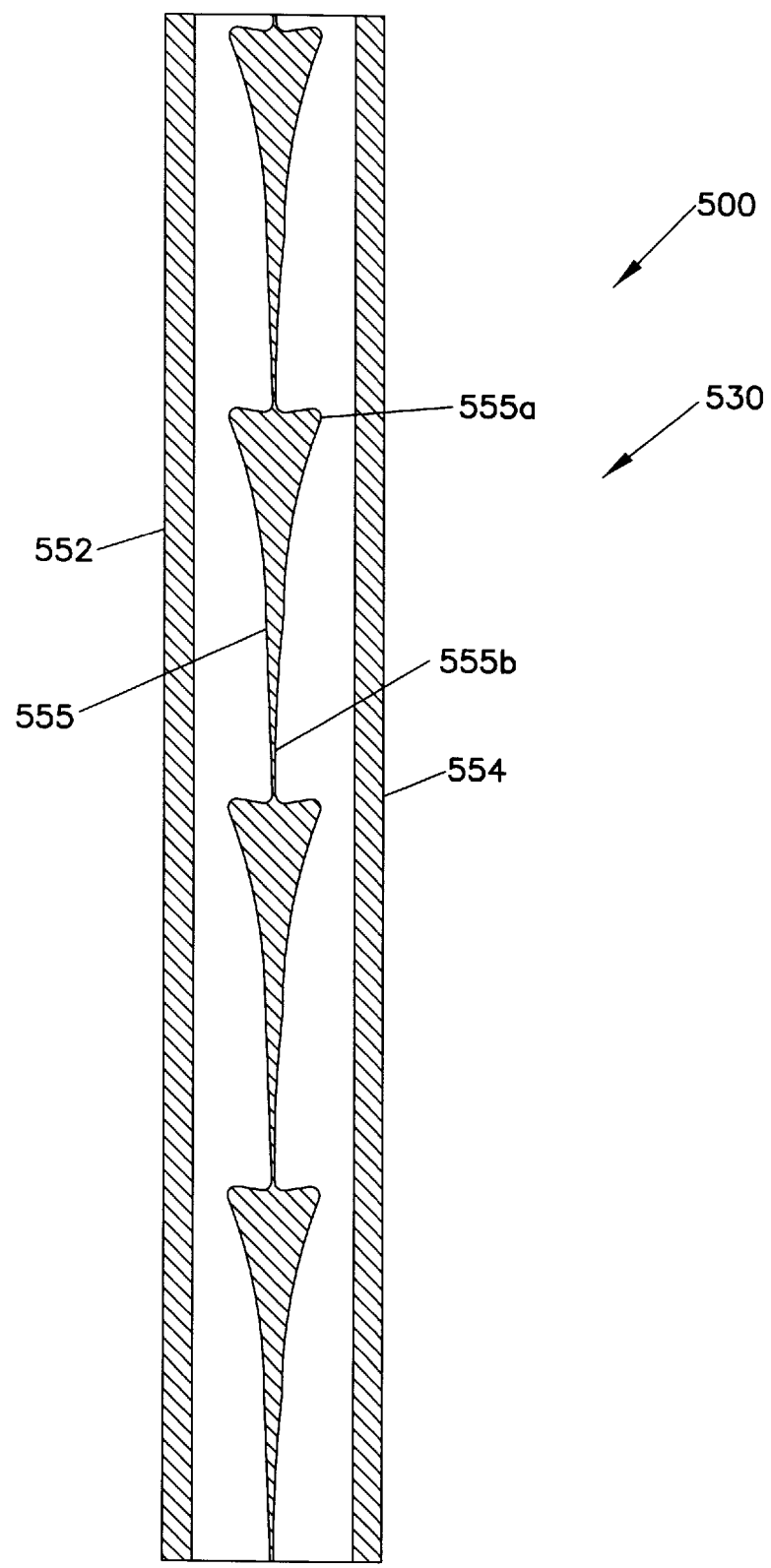
FIG. 13 is bottom view of an extended length of profiled material after the crimping process of FIGS. 11 and 12.

FIG. 13 shows the resulting extended length of profiled material 500 that results from the crimping operation of FIGS. 11 and 12. In particular, FIG. 13 shows a bottom view of an extended length of crimped profiled material 530 having lengths of first and second arms or sidewalls 552, 554 with extended length of spreader 555 therebetween. Extended length of spreader 555 has alternating thick sections 555a and thinned sections 555b.

It is understood that although crimping mechanism 300 was used to provide the alternating portions of thick sections 555a and thinned sections 555b, any process or mechanism can be used to deform, crimp, crush, form, contort, or otherwise provide the desired characteristics to extended length of spreader 555. For example, in some embodiments, a rotary crimping mechanism could be used. The extended length of spreader 555 could be crimped by a rotating crimping mechanism having continuous deforming features along its outer periphery. The outer periphery would move at essentially the same speed as extended length of spreader 555.

Further, it should be understood that although FIGS. 11 and 12 are directed at and described deforming or crimping of extended lengths of profiled material 500, individual slider devices can be deformed or crimped in the same manner.

Figure 14:
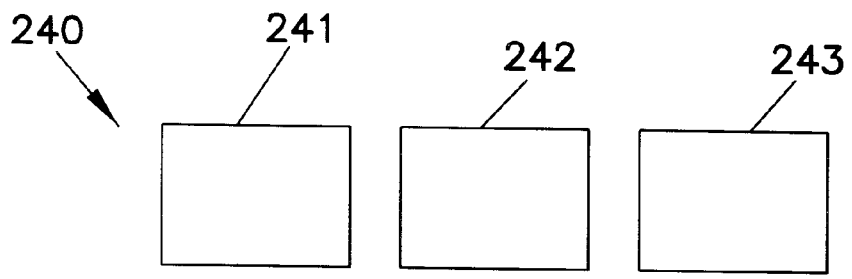
FIG. 14 is a top view of a first embodiment of a slider device made by the present disclosure.
Figure 15:
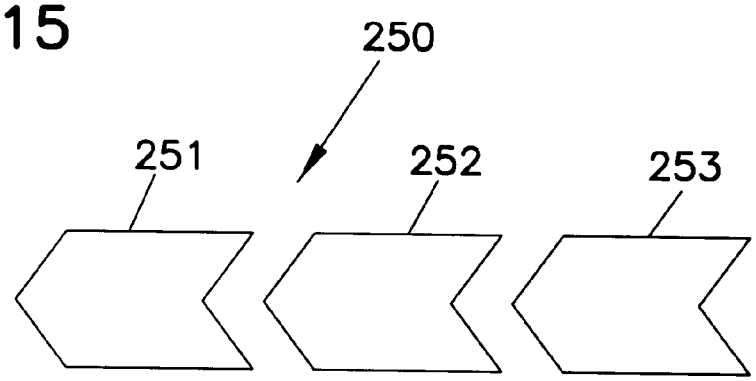
FIG. 15 is a top view of a second embodiment of a slider device made by the present disclosure.
Figure 16:
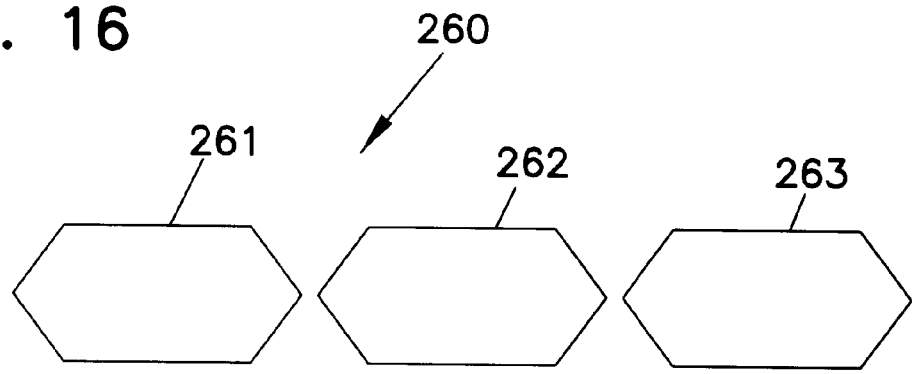
FIG. 16 is a top view of a third embodiment of a slider device made by the present disclosure.

Any extended length of profiled material 500, whether being an extended length of manipulated profile 560 such as in FIG. 10, or an extended length of crimped profiled material 530 such as in FIG. 13, or a combination of the two, can be processed into individual, separate slider devices. This can be done by any cutting mechanism, such as cutting device 200 with blade 205 of FIG. 5, a rotary cutting blade 210 of FIG. 6, or any other device, such as a laser, water jet, etc. The slider devices, cut from the extended length of profiled material 500, can have any desired shape. FIGS. 14 through 16 show three embodiments of shapes that can be cut from extended length of profiled material 500.

In FIG. 14, slider devices 240 are shown; specifically, slider devices 241, 242, 243 are shown. These slider devices were cut from an extended length of profiled material 500 and have a rectangular shape. In FIG. 15, slider devices 250 are shown; specifically, slider devices 251, 252, 253 are shown. These slider devices were cut from an extended length of profiled material 500 and have an elongated shape with an arrow at each end, with each arrow pointing in the same direction; slider device 252 is nestable within slider device 251, slider device 253 is nestable within slider device 252, and so on. Other shapes, such as semi-circles, are also nestable. Each of slider devices 240, 250 were cut from an extended length of profiled material 500 without any wasted material. In FIG. 16, slider devices 260 are shown; specifically, slider devices 261, 262, 263 are shown. These slider devices were cut from an extended length of profiled material 500 and have an elongated shape with an arrow at each end, but with the two arrows on a single slider device pointing in opposite directions. These slider devices 261, 263, 262 were cut from an extended length of profiled material 500, with some material wasted at each end. Any of these slider devices 240, 250, 260, or any slider devices made by the techniques discussed herein, can be mounted on a zipper closure 20 (FIG. 1) to form package 10.

The above specification and examples are believed to provide a complete description of the manufacture and use of particular embodiments of the disclosure. Many embodiments of the disclosure can be made.

What is claimed:

1. A method of making a plurality of slider devices, each slider device having a first end and an opposite second end, a first side edge and an opposite second side edge, a top wall, a first arm depending from the top wall at the first side edge with a first hook on the first arm opposite the top wall, and a second arm depending from the top wall at the second side edge, with a second hood on the second arm opposite the top wall, and a spreader depending from the top wall between the first arm and the second arm; each slider device constructed and arranged to interlock first and second mating profiles of a zipper closure when the slider device is moved in a first direction along the zipper closure, and to disengage the first and second mating profiles when the slider device is moved in an opposite second direction along the zipper closure; the method comprising:

(a) forming an extended length of profiled material, the profiled material comprising:
   (i) an extended length of top wall;
   (ii) an extended length of spreader material depending from the extended length of top wall;
   (iii) an extended length of first arm material depending from the extended length of top wall; and
   (iv) an extended length of second arm material depending from the extended length of top wall; and
(b) converting the extended length of profiled material into a plurality of slider devices.

2. The method according to claim 1, further comprising:
(a) winding the extended length of profiled material; and
(b) unwinding the extended length of profiled material prior to converting the extended length of profiled material into a plurality of slider devices.

3. The method according to claim 1, wherein the step of converting the extended length of profiled material into a plurality of slider devices comprises:
(a) providing a slice in the extended length of profiled material, the slice extending at least partially through the extending length of profiled material.

4. The method according to claim 3, wherein the step of converting the extended length of profiled material into a plurality of slider devices comprises:
(a) providing a slice in the extended length of profiled material, the slice extending partially through the extending length of profiled material;
(b) winding the extended length of profiled material having the slice therein;
(c) unwinding the extended length of profiled material having the slice therein; and
(d) separating a plurality of slider devices from the extended length of profiled material.

5. The method according to claim 3, wherein the step of providing a slice in the extended length of profiled material comprises:
(a) slicing the extended length of profiled material with a rotary cutting blade.

6. The method according to claim 1, further comprising:
(a) deforming at least a portion of the extended length of spreader material.

7. The method according to claim 6, wherein the step of deforming at least a portion of the extended length of spreader material comprises:

(a) deforming the extended length of spreader material to provide a varying distance between the extended length spreader material and the extended length of first arm material, and the extended length spreader material and the extended length of second arm material.

8. The method according to claim 7, wherein the step of deforming the extended length of spreader material comprises:
(a) crimping portions of the extended length of spreader material to provided thinned portions of extending length of spreader material.

9. The method according to claim 8, wherein the step of converting the extended length of profiled material into a plurality of slider devices comprises:
(a) converting the extended length of profiled material into a plurality of slider devices, wherein each slider devices comprises a thinned portion.

10. The method according to claim 6, wherein the step of deforming at least a portion of the extended length of spreader material comprises:
(a) deforming the extended length of spreader material to provide a varying distance between the extended length spreader material and the extended length of top wall.

11. The method according to claim 10, wherein the step of forming an extended length of profiled material comprises:
(a) extruding material through a die having a spreader passageway defined by an adjustable feature, the adjustable feature adapted to provide a varying distance between the extended length spreader material and the extended length of top wall.

12. The method according to claim 11, wherein the step of extruding material through a die having a spreader passageway defined by an adjustable feature comprises:
(a) extruding material through a die having a spreader passageway defined by an adjustable feature movable from a first position to a second position.

13. The method according to claim 1, wherein the step of converting the extended length of profiled material into a plurality of slider devices comprises:
(a) converting the extended length of profiled material into a plurality of slider devices, the plurality of slider device comprising a first slider device having a first end and a second end, and a second slider device having a first end and a second end, the second end of the first slider device being nestable with the first end of the second slider device.

* * * * *